April 19, 1966     R. G. LANDWER     3,246,375

FASTENER

Filed July 30, 1962                                      2 Sheets-Sheet 1

INVENTOR.
ROBERT G. LANDWER
BY Charles J. Benfold
ATTORNEY

April 19, 1966   R. G. LANDWER   3,246,375
FASTENER

Filed July 30, 1962   2 Sheets-Sheet 2

INVENTOR.
ROBERT G. LANDWER
BY Charles S. Penfold
ATTORNEY

— Patented Apr. 19, 1966

3,246,375
FASTENER
Robert G. Landwer, 18140 Chicago Ave., Lansing, Ill.
Filed July 30, 1962, Ser. No. 213,488
8 Claims. (Cl. 24—73)

The subject invention relates generally to means for fastening a member to a mounting and more particularly is directed to a fastener or clip for detachably connecting channel moulding members or strips to a panel or panels of a body of an automotive vehicle. Such channel members or strips are generally elongate and provided with a chrome finish and serve to ornamentally trim and streamline the external surfaces of a car body.

The conventional fasteners which are employed as original equipment components for attaching the channel members in place are of the spring metal type and include one or more portions which are secured within the confines of the channel and one or more exposed resiliently flexible portions which are adapted to be pressed into an opening provided therefor in the car body.

Due to the wide ranges in the widths or cross-sectional dimensions of the channels used on different makes of cars it is necessary to utilize a great many different sizes of fasteners and this requires that the average body repair shop maintain a large inventory of fasteners in stock. Keeping a large supply of different sized fasteners on hand is expensive and in some instances is not justified. Also, as newer models of cars are manufactured some of the fasteners become obsolete.

Moreover, some fasteners currently being used are constructed of several individual metal parts which require adjustment and ofttimes becomes separated and lost. These particular fasteners, including those above referred to, further have the inherent disadvantage that they tend to wear internal surfaces of the channels and the marginal edges defining the openings in the car body and thereby effect a gradual loosening of the connection between the fasteners, channel and car body, which results in creating vibratory or rattling noises. Also, in some instances, corrosion or rusting of the car body and the metal fasteners will effect a loosening or breaking of the connection and in other instances, forcing of such fasteners into the body results in distorting the channel moulding.

With the foregoing in mind, one of the important objects of the invention is to provide an improved fastener or clip which overcomes the disadvantages of the conventional fasteners above described.

More particularly, an object of the invention is to provide a fastener which is constructed of a moulded resiliently flexible plastic material which offers advantages with respect to cost of manufacture, installation and efficiency in operation. The fastener embodying the subject invention has proven very advantageous in automatically seating or adjusting itself to the opening in the car body to provide a snug non-vibratory connection with the margins of said opening.

A significant feature of the invention resides in providing a fastener which is primarily adapted for use in the car body repair shop but may also be used as an original equipment item. More specifically in this respect, the subject fastener is so designed and constructed that it may be readily reshaped or cut and fitted into channels of different cross-sectional dimensions. Otherwise expressed, a fastener of one size may be cut custom made into any one of an infinite number of smaller sizes for use with channels of reduced cross-sectional dimensions, thus obviating the necessity of carrying a high inventory of the conventional fasteners as alluded to above.

The fastener embodying the subject invention also has the advantage of providing greater areas of contact or engagement between the fastener and the marginal edge defining the opening in the car body as well as between the fastener and the channel, as distinguished from point contacts offered by the conventional wire clips. These factors are important because in some instances the opening and/or channel becomes enlarged due to rust and/or wear or damage.

A specific object of the invention is to provide a fastener which is very durable and which, due to its non-metallic and resilient characterists, is substantially noiseless in operation.

A further specific object is to provide a fastener which will not scratch or damage the external finish and the channel moulding and/or on the car body during installation of the moulding.

Additional objects and advantages of the invention will become apparent after the description hereinafter set forth is considered in conjunction with the drawings annexed hereto.

Figure 1:
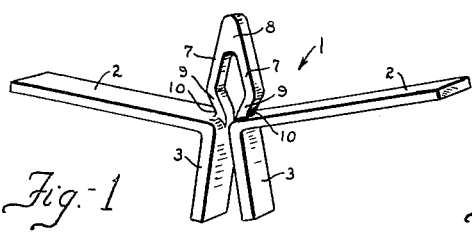
FIGURE 1 is a perspective view of one form of a fastener.
Figure 2:
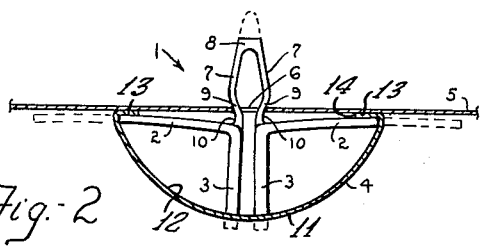
FIGURE 2 is a transverse section taken through a channel and a mounting panel, showing the fastener secured in an opening provided in the panel and cut and fitted in the channel.
Figure 3:
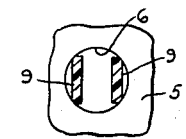
FIGURE 3 is a transverse section showing the mode in which forwardly extending portions of the fastener are received in the opening provided in the panel.

The first form of the fastener exemplified in FIGURES 1, 2 and 3 is a one-piece construction and preferably comprises a head or entering part generally designated 1, a pair of corresponding arms or wings 2 and a pair of corresponding legs 3.

The fastener may be made from any material suitable for the purpose but is preferably constructed from a moulded plastic, such as nylon or Delrin, which is resiliently flexible in character, so that the head, arms and legs may be flexed with respect to one another and thereby facilitate prior attachment of the fastener to a channel 4 and to a mounting 5, such as a car panel, provided with an opening 6 into which the head 1 is adapted to be inserted.

The head 1 is comprised of a pair of corresponding converging portions 7 which are joined together at 8, and a pair of converging portions 9, somewhat shorter in length than the portions 7, and are joined to inner portions of the wings anl legs or junctions therebetween. It will be observed that the aforesaid portions of the head and the wings and legs are preferably rectangular or squared in cross-section, that the portions constituting the head are somewhat smaller in cross-section than that of the wings and legs, and that the converging portions 9 of the head are respectively angularly disposed with respect to the wings to define acute angular receiving means or formations 10 for receiving marginal edge portions of the mounting defining the opening 6, as depicted in FIGURES 2 and 3. It will also be noted that the head is preferably arranged in spaced apart relation to the marginal side edges of the wings. In other words, the parallel faces or surfaces of the head are inset with reference to the longitudinal parallel edges of the wings. The fastener may be described as being generally in the form of an inverted V-shaped body having elongate portions which are formed to provide a head at one end, with arms and/or wings respectively carried by and extending laterally from the elongate portions.

The wings and legs are preferably elongate, planar and disposed generally at right angles to the legs which are normally divergent as shown in FIGURE 1.

The channel moulding depicted in FIGURE 2 comprises a curved wall 11 having an internal concave bearing surface 12 and a pair of corresponding inturned longitudinally extending walls or flanges 13 which are disposed in the same plane and define a longitudinal opening or slot 14 through which the arms and legs of the fasteners are inserted when the latter are being assembled with the channel. The flanges have internal bearing surfaces which in combination with the concave surface 12 of the curved wall define a pair of longitudinally extending recesses which receive the extremities of the arms as shown in FIGURE 2.

It will be observed that the distance between the marginal end surfaces of the arms is somewhat greater than the width of the channel and that the distance between the marginal end surfaces of the legs and the receiving means 10 is somewhat greater than the height of the channel.

To use the fastener, portions of the ends of the arms and/or legs are preferably cut off sufficiently for reception in the channel. In some instances, due to obstructions in back of the panel mounting, it may be desirable to cut off a portion of the head to avoid such obstruction to proper insertion of the head. The portions of the fastener to be severed can be readily ascertained by measurement. After the fastener has been fashioned or cut to the proper size, it is manipulated so that the legs are brought into engagement with the concave surface of the curved wall and then turned ninety degrees, during which turning the arms are pressed into the channel so that their ends will move into the recesses and against the internal surfaces of the flanges as shown in FIGURE 2. The arms or wings are preferably somewhat smaller in cross-section than that of the legs and therefore are slightly more flexible for accommodation in the channel.

The number of fasteners assembled with the channel is generally dependent in the length of the channel and number of openings in the mounting. After the desired number of fasteners are assembled with the channel in the proper longitudinal spaced relationship the channel is manipulated to a position alongside the mounting or car body to locate the head of each fastener in its opening, so that when pressure is applied to the channel the head portions 7 will be caused to contract or move toward one another until the widest part of the head passes through the opening, whereupon the head will automatically expand to cause its portions 9 to slide into locking engagement with the marginal edge of the opening and thereby resiliently and effectively draw or pull the flanges into pressure bearing engagement with the mounting. Attention is directed to the fact that the arms of the fastener are flexed and spaced angularly from the mounting for clearance purposes so that the head portions 9 will continuously cam and place the fastener under stress or tension. It is important to note that the legs serve to stabilize the position of the head when the latter is being inserted into the opening and that the legs are disposed on opposite sides of the longitudinal axis of the channel and somewhat closer together after the fastener is assembled with the channel.

Of further significance is the fact that the areas of engagement and their locations between the ends of the arms and legs with the channel and the areas of engagement and their locations between the head and margin of the opening serve to firmly stabilize the connections between the fastener, channel and mounting.

Attention is also directed to the fact that the channel is inherently resiliently flexible and since this is also true of the fastener, it will be manifest that exact or accurate measurements with respect to reducing the size of the fastener are not required. Otherwise expressed, the size of the fasteners may vary within practical limits and still readily adjust themselves to the channel during assembly.

Figure 4:
FIGURE 4 is a partial view of a second modified form of fastener showing one of a pair of adjustable elements thereon for varying the size of the fastener.

Referring to FIGURE 4 of the drawing, each of the arms or legs or a fastener may be provided with a slidable sleeve S which is held in frictional engagement therewith. The sleeves can be readily adjusted to obtain the desired size of the fastener in lieu of cutting the arms or legs.

Figure 4A:
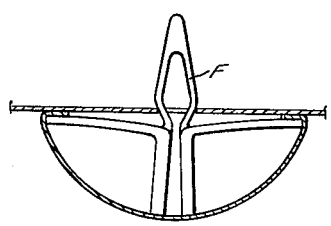
FIGURE 4a is a transverse section taken through a third form of a fastener and a channel showing a fastener which has been moulded to the proper size.

In FIGURE 4a there is shown a fastener F which has been moulded to the proper size as an original equipment item.

Figure 5:
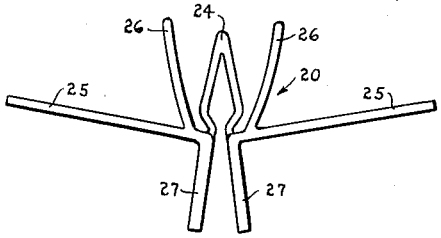
FIGURE 5 is a fourth form of a fastener adapted for use with a channel having a depth somewhat greater than the one shown in FIGURE 2.
Figure 6:
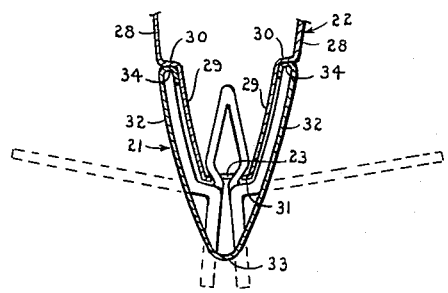
FIGURE 6 is a view showing the fastener of FIGURE 5 cut to a reduced size and connecting a channel with a panel.

As illustrated in FIGURES 5 and 6, there is disclosed a fastener generally designed 20 for attaching a channel 21 to a mounting 22 provided with an opening 23. The fastener comprises a head 24, arms 25, wings 26 and legs 27, which are resiliently flexible. The head, arms 25 and legs 27 are substantially the same as the corresponding portions of the fastener 1, with the addition of the wings 26.

The mounting 22 is formed to include a pair of spaced portions 28 and a pair of converging portion 29 joined to the portions 28 by a pair of inturned shoulder portions 30. The converging portions 29 are joined by a wall 31 provided with a plurality of longitudinally spaced openings, including the opening 23.

The channel 21 comprises a pair of curved corresponding side walls 32 joined together at 33 and a pair of corresponding inturned curved flanges 34 forming longitudinally extending recesses.

As shown in FIGURE 6, the wings, arms and legs are cut for proper entry into the channel with the ends of the wings 26 seated in the recesses formed by the flanges 34, the ends of the arms and legs engaging internal surfaces of the side walls 32. The head is centrally located between the side walls 32. In this particular form or embodiment the channel may be sprung to spread the side walls apart sufficiently to assist in facilitating assembly of the fastener into the channel when the fastener is being inserted and turned therein. In view of the manner in which the channel and fastener structures of FIGURES 1 and 2 are applied by a mounting it will be manifest that the fastener and channel structure of FIGURES 5 and 6 are similarly applied to the mounting 22. As shown in FIGURE 6, after the channel is attached to the mounting, the flanges of the channel will be held in pressure engagement with the shoulders 30 of the mounting by reason of the camming engagement of the head with the marginal edge of the opening 23. It will be observed that the channel recesses conceal the portions 29 and that the side walls of the channel, in effect, constitute continuations of the portions 28 of the mounting.

Figure 7:
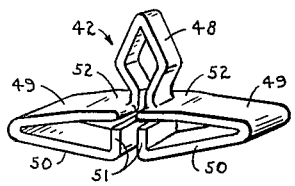
FIGURE 7 is a perspective view of a fifth form of a fastener.
Figure 8:
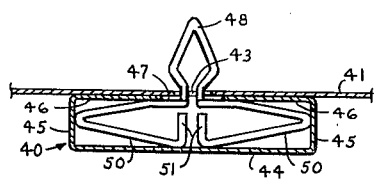
FIGURE 8 is a view showing the fastener of FIGURE 7 connecting a channel to a mounting.

In the form depicted in FIGURES 7 and 8, a channel 40 is attached to a mounting 41 by fasteners including the resiliently flexible fastener 42.

The mounting 41 is provided with openings including an opening 43 and the channel includes a bottom planar wall 44, parallel side walls 45 and inturned planar walls 46 defining a longitudinally extending opening or slot 47.

The fastener 42 includes a head 48, a pair of arms 49 provided with continuations 50, legs, or portions underlying the arms, and a pair of inturned parallel portions 51. It will be observed that the arms and continuations are disposed in acute angular relationships and that the arms adjacent the head are preferably planar as indicated at 52.

The fastener is assembled with the channel by inserting the arms through the slot 47 and then turning the fastener so that the planar portion 52 engages the inner surfaces of the inturned walls 46, the junctions between the arms and continuations engaging the side walls 45 and the junctions between the continuations 50 and 51. Assembly of the channel with the mounting by inserting the head into opening 43 should be obvious. When the channel is resiliently held in place by the head of the fastener the inturned portions 50 of the channel will press against the mounting. The inturned portions also serve as stops which prevent inward movement of the head when it is being inserted into the opening. It will be noted that the fastener 42 does not require any cutting to size.

Figure 9:
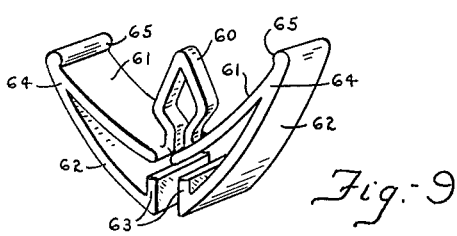
FIGURE 9 is a sixth form of a fastener.

FIGURE 9 of the drawing shows a resiliently flexible fastener having a head 60, arms 61 and underlying portions or legs 62 provided with inturned substantially parallel portions 63. It will be observed that the arms and underlying portions are curved and joined by portions 64 provided with inturned abutments or portions 65. The fastener is adapted for connection with a channel moulding (not shown) which may resemble the channel 21, above referred to. If desired, portions of the abutments 65 can be cut off to properly fit the fastener into a channel. The portions 63 serve to limit inward movement of the head when the latter is being inserted into an opening.

Figure 10:
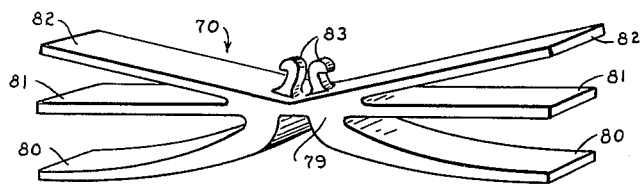
FIGURE 10 is a seventh form of a fastener.
Figure 11:
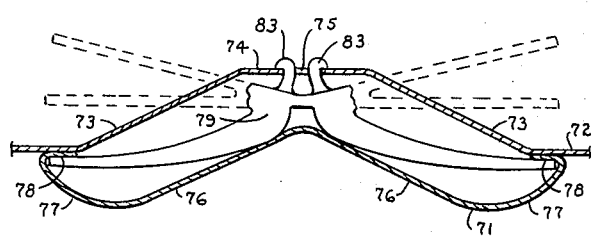
FIGURE 11 is a view of the fastener of FIGURE 10 fashioned to operatively connect a channel to a mounting.
Figure 14:
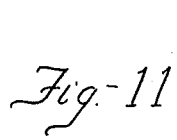
FIGURE 14 is a perspective view of one of the components of the fastener depicted in FIGURE 12.
Figure 15:
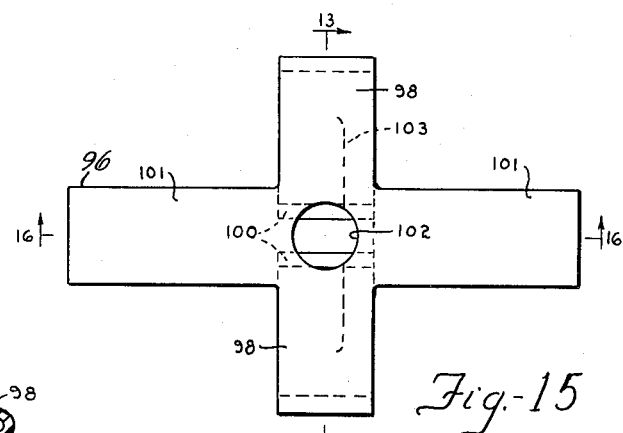
FIGURE 15 is a view of one of the components of the fastener illustrated in FIGURE 12.

In FIGURES 10 and 11 there is exemplified a fastener 70 for attaching a channel 71 to a mounting panel 72. The mounting is provided with a channel recess formed by a pair of inclined side walls 73 and a base wall 74 having openings including an opening 75 therein. The channel 71 comprises a pair of inclined walls 76 having curved continuations 77 provided with inturned flanges 78.

The fastener 70 is resiliently flexible in character and comprises a generally arched shaped body 79 provided with a pair of lower curved arms or legs 80, an intermediate pair of arms 81 and an upper pair of arms 82 which are more or less carried by and extend laterally from the legs of the arch. It will be observed that the arms at each side of the vertical axis of the fastener are disposed at acute angles with respect to one another and that the top of the arch is provided with a head formed by a pair of corresponding upstanding hooks 83.

As depicted in FIGURE 11, the intermediate and upper pairs of arms may be severed for engagement with the inclined walls 73, as distinguished from any arms being cut for entry into a channel. The fastener is adapted for assembly with the channel so that inner portions of the lower pair of arms will engage the inclined walls 76 of the channel and that their ends will be received in the channel against the flanges 78. When the head or hooks 83 are properly inserted into the openings in the mounting the ends of the upper and intermediate arms will engage the inclined walls of the mounting and the flanges of the channel will resiliently bear against planar portions of the mounting.

FIGURES 12 through 16, among other things, exemplify a fastener comprised of a pair of components which are operatively connected for use in attaching a channel 90 to a mounting 91 provided with openings including an opening 92. The channel comprises a curved wall 93 having inturned flanges 94 defining a longitudinal opening or slot 95.

The fastener comprises a body 96 and a head 97 which are resiliently flexible. The body is preferably in the form of a cross and comprises a pair of aligned curved arms 98 having underlying straight portions or legs 99 provide with inturned parallel portions 100. The body is also provided with a pair of corresponding aligned arms 101 which are disposed at right angles to the arms 98 and slightly longer than the latter. The body is further provided with a central aperture 102 and an inturned abutment 103 extending longitudinally of the arms 98 and below the aperture.

The head 97 includes a pair of converging portions 104 and a pair of offset legs 105. The lower surfaces of the legs are preferably planar and their upper surfaces curved. The head also includes a pair of converging portions 106, which in combination with the upper surfaces of the legs define formations for receiving the marginal edge of the opening 92 in the mounting.

Figure 12:
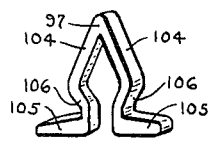
FIGURE 12 is a view of an eighth form of a fastener comprised of a pair of components which are operatively connected.
Figure 16:
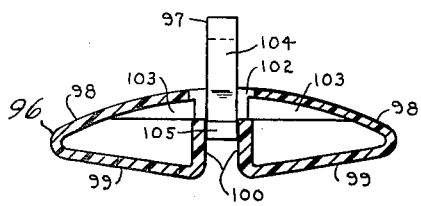
FIGURE 16 is a tranverse section taken substantially on line 16—16 of FIGURE 15 showing the fastener cut to a particular size for attaching a channel to a mounting.
Figure 16:
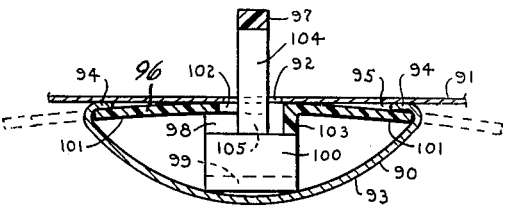
Figure 13:
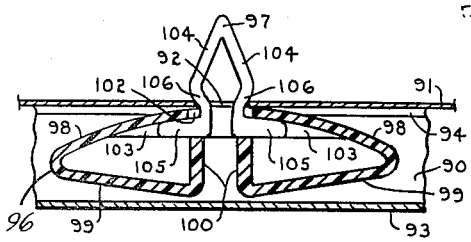
FIGURE 13 is a transverse section taken substantially on line 13—13 of FIGURE 15 showing the fastener of FIGURE 12 connecting a channel to a mounting.

The fastener is preferably first assembled or connected and this is accomplished by inserting the head upwardly between the upturned portions 100 and through the opening 102 of the body as depicted in FIGURE 12 to a position whereby the head can be turned ninety degrees to cause the legs to ride onto the upper surfaces of the portions 100 and against the abutment 103 as shown in FIGURE 13.

After the body and head parts of the fastener are assembled the arms 101 may be cut to size, whereupon the fastener is manipulated to cause the ends of the arms resiliently bear against the rear surfaces of the flanges of the channel and so that marginal edges of the body portions 99 may engage the wall 93. With this setup, the arms of the fastener extend transverse to the longitudinal axis of the channel and the portions 98 and 99 lengthwise thereof to afford a stable connection between the fastener and channel. When the channel is properly applied to the mounting by inserting the heads of fasteners into openings in the mounting, the portions 106 of the heads will engage the margins of the openings to effect a tight locking connection with the mounting in substantially the same manner that the heads of the other fasteners above described are held. When the channel is so held, the flanges 94 and portions of the arms are held against the mounting.

It view of the above, it will be manifest that various forms of fasteners have been designed and constructed whereby to provide improved connections between a channel moulding and a mounting in accord with the objects of the invention as set forth above.

Having thus described my invention, it is obvious that various modifications may be made in the same without departing from the spirit of the invention, and, therefore, I do not wish to be understood as limiting myself to exact forms, constructions, arrangements, and combinations of parts herein shown and described.

I claim:

1. A fastener of the kind described comprising a one-piece moulded structure of resiliently flexible material, said structure having a head comprising a pair of relatively movable portions for entry into an opening provided in a mounting, and a pair of elongate laterally extending divergent portions adapted for entry into a channel member, said divergent portions being capable of being severed where desired whereby to accommodate their entry into the channel member, said pair of elongate portions being respectively carried by and movable with said pair of relatively movable portions.

2. A fastener of the purpose described consisting of a moulded structure of non-metallic material, said structure comprising a head having a pair of resiliently flexible portions whereby to facilitate entry of the head into on opening provided in a mounting, a pair of elongate laterally extending divergent arms, and a pair of angularly disposed portions, said head, arms and disposed portions being arranged substantially in a single plane, said arms and said angularly disposed portions being connected to and respectively movable with said resiliently flexible portions and capable of being severed at desired locations for shaping the structure for disposition in a channel member.

3. A fastener for the purpose described comprising a moulded one-piece body having a pair of elongate portions connected together at one end for movement relative to a medial line of the fastener, a pair of arms respectively carried by and extending outwardly from said elongate portions at locations spaced from said end, said elongate portions and said arms being capable of being severed at desired locations, said one end being enlarged to provide a head adapted for entry into an opening provided in a mounting and said arms being located on opposite sides of the medial line and movable with said elongate portions.

4. A fastener for the purpose described comprising a one-piece moulded body of resiliently flexible material, said body comprising a pair of elongate portions joined at one end by a head for movement relative to a medial line of the fastener, said head being expansible and contractible for entry into an opening provided in a mounting, and said elongate portions being respectively provided with a pair of means for locking engagement with internal surfaces of a channel moulding, said pair of means being respectively carried by and movable with said elongate portions.

5. The structure defined in claim 4, in which said pair of means is in the form comprised of a pair of arms, and a pair of sleeve members slidably adjustable on said arms for extending their lengths.

6. The structure defined in claim 4, in which said elongate portions are also provided with a pair of laterally extending severable portions for engaging other internal surfaces of a channel moulding.

7. The structure defined in claim 4, in which said pair of locking means includes a pair of laterally extending portions provided with underlying continuations and portions carried by said continuations which are directed toward said head.

8. A fastener for the purpose described comprising a pair of elongate portions integrally connected at a fore end to form a generally inverted V-shaped body, said elongate portions adjacent said end being shaped to form a pair of rearwardly converging relatively movable means for receiving the marginal edge of an opening provided in a mounting, and said elongate portions being provided with severable portions extending laterally therefrom for securement in a channel moulding.

References Cited by the Examiner
UNITED STATES PATENTS

| | | | |
|---|---|---|---|
| 2,086,288 | 7/1937 | Van Uum. | |
| 2,625,722 | 1/1953 | West | 24—73 |
| 2,745,156 | 5/1956 | Bedford | 24—73 |
| 2,885,754 | 5/1959 | Munse | 24—73 |
| 3,080,629 | 3/1963 | Meyer | 24—73 |

FRANK L. ABBOTT, *Primary Examiner.*

RICHARD W. COOKE, JR, *Examiner.*